United States Patent
Vasudevan et al.

(10) Patent No.: US 7,096,505 B2
(45) Date of Patent: Aug. 22, 2006

(54) SYSTEM AND METHOD TO SUPPORT VARYING MAXIMUM CRYPTOGRAPHIC STRENGTH FOR COMMON DATA SECURITY ARCHITECTURE (CDSA) APPLICATIONS

(75) Inventors: Narayanan Vasudevan, Gaithersburg, MD (US); Sohail Malik, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 10/788,855

(22) Filed: Feb. 27, 2004

(65) Prior Publication Data

US 2004/0172546 A1   Sep. 2, 2004

Related U.S. Application Data

(63) Continuation of application No. 09/533,073, filed on Mar. 22, 2000, now Pat. No. 6,715,077.

(60) Provisional application No. 60/125,813, filed on Mar. 23, 1999.

(51) Int. Cl.
  *G06F 11/00*  (2006.01)
  *G06F 17/60*  (2006.01)

(52) U.S. Cl. ............... 726/30; 726/22; 726/19; 726/18; 380/279; 380/286; 380/45

(58) Field of Classification Search ............... 380/45, 380/286, 279; 726/18–19, 22, 30
See application file for complete search history.

(56) References Cited

U.S. PATENT DOCUMENTS

| 4,203,166 A | * | 5/1980 | Ehrsam et al. ............. 380/45 |
| 5,323,464 A | * | 6/1994 | Elander et al. ............ 713/191 |
| 5,734,721 A | * | 3/1998 | Clark ....................... 380/46 |
| 5,850,443 A | * | 12/1998 | Van Oorschot et al. ..... 380/285 |
| 5,987,124 A | * | 11/1999 | Matyas et al. ............. 380/37 |
| 6,104,810 A | * | 8/2000 | DeBellis et al. ........... 380/43 |
| 6,560,581 B1 | * | 5/2003 | Fox et al. ................. 705/51 |

* cited by examiner

*Primary Examiner*—Norman M. Wright

(57) ABSTRACT

A technique for cryptographic strength selection for at least one application is provided, in accordance with a framework for providing cryptographic support of the at least one application. Data encryption is performed at a first cryptographic strength when the at least one application is privileged to perform encryption at a first cryptographic strength. Data encryption is performed at a second cryptographic strength when the at least one application is not privileged to perform encryption at the first cryptographic strength. The first cryptographic strength is stronger than the second cryptographic strength.

20 Claims, 4 Drawing Sheets

PRIVILEGED CDSA APPLICATION

OVERVIEW OF ENCRYPTION SEQUENCE FOR STRONG AND WEAK CRYPTO APPLICATIONS

FRAMEWORK INITIALIZATION

APPLICATION CREATES CRYPTO CONTEXT

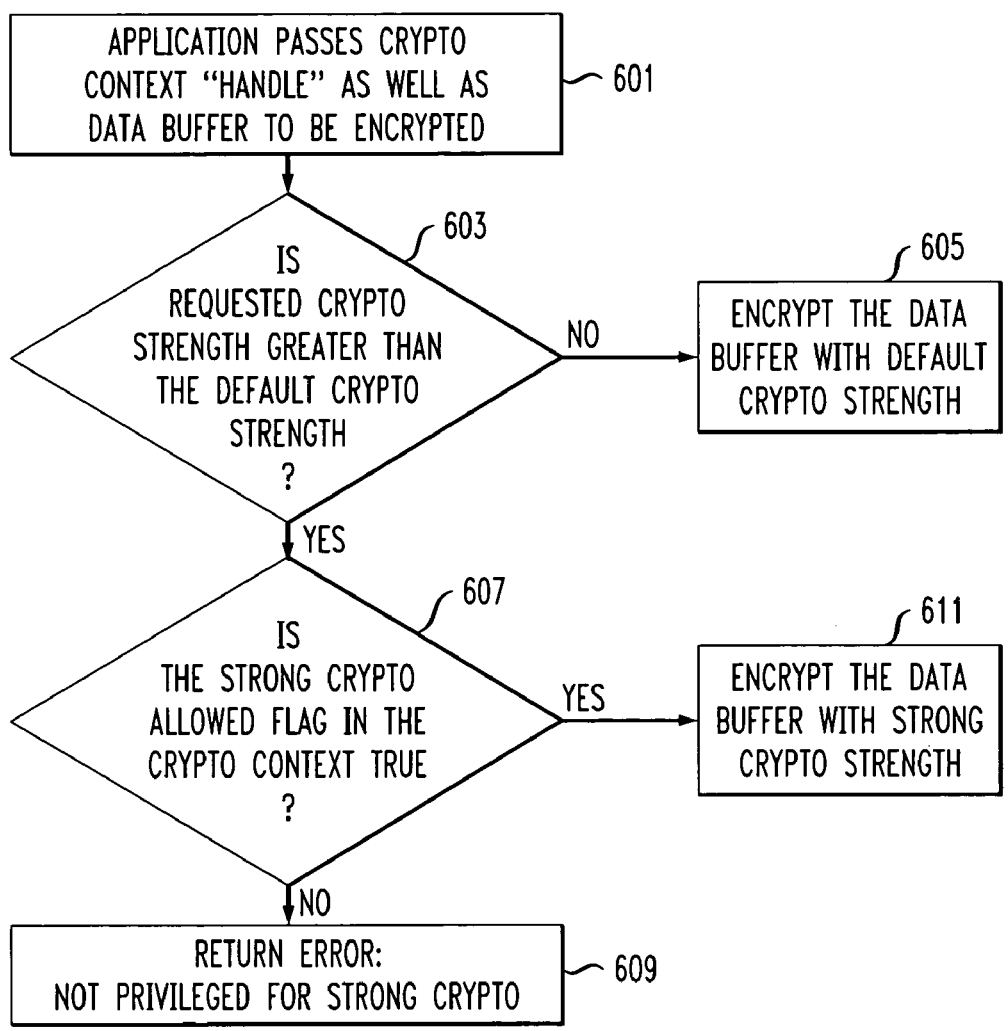

SYSTEM AND METHOD TO SUPPORT VARYING MAXIMUM CRYPTOGRAPHIC STRENGTH FOR COMMON DATA SECURITY ARCHITECTURE (CDSA) APPLICATIONS

CROSS-REFERENCE TO RELATED APPLICATION

This application is a continuation of U.S. application identified by Ser. No. 09/533,073, filed Mar. 22, 2000, now U.S Pat. No. 6,715,077, the disclosure of which is incorporated by reference herein.

This application claims the benefit of the filing date of Provisional Application Ser. No. 60/125,813 filed Mar. 23, 1999, and assigned to the same Assignee as that of the present invention.

FIELD OF THE INVENTION

This invention relates to cryptographic applications incorporating Common Data Security Architecture (CDSA). More particularly, the invention relates to systems and methods to support varying maximum cryptographic strength for CDSA applications.

BACKGROUND OF THE INVENTION

Vendors that manufacture applications that require encryption/decryption incorporate cryptographic libraries in their applications. However, for export, cryptography is controlled by Government regulations. By default, cryptographic strength is constrained to weak crypto (e.g., 56 bit DES.). Special industries, for example, financial, can use "strong" crypto (e.g., 168 bit DES.). Vendors usually statically link cryptographic libraries into their applications. Vendors cannot easily change from one cryptographic library to another because the Application Programming Interfaces (APIs) vary between different vendors' libraries. The Common Data Security Architecture (CDSA) provides programmable interfaces for cryptographic and digital certificate services using a "plug and play" model. The CDSA Specification is attached as Appendix 1 and is available from the Intel Corporation, 5200 N.E. Elam Young Parkway, Hillsboro, Oreg. 97124-6497. The Specification is also available from cdsa@dbmg.com. With CDSA, security service providers may support varying strengths of cryptographic algorithms. Normally for a given implementation of CDSA, all applications will be allowed to use the union of all algorithms in cryptographic strengths provided by the registered service providers.

However, there is sometimes a need to allow the same implementation of CDSA to support the cryptographic needs of multiple applications, each of which needs to be constrained to a particular maximum cryptographic strength. For example, financial applications in non-U.S. jurisdictions may be allowed to use 168 bit strength cryptography, while non-financial applications may only be allowed to use 56 bit strength cryptography. What is needed is an improved system and a method to allow a single CDSA implementation to control the maximum cryptographic strength of various applications based on a configurable cryptographic control policy enforced by the CDSA framework.

SUMMARY OF THE INVENTION

An object of the invention is a system and method to provide an application with varying cryptographic strength based on a configurable cryptographic control policy implemented in the application.

Another object is a system and method creating a crypto context for an application implemented by the CDSA framework.

Another object is a data structure in a CDSA framework identifying exemptions or privileges contained in applications for varying the cryptographic strength of the application.

These and other objects, features and advantages are achieved in an Improved CDSA system (CDSA-I) including a standard CDSA framework coupled via an Application Program Interface to an application requiring cryptographic support. During manufacture, a cryptographic control privilege is incorporated into the application, as part of an exemption mechanism, which exemption may or may not be enforced by the CDSA framework. For maximum cryptographic strength, an application must be signed by a private key controlled by the CDSA framework vendor. Inside the CDSA framework, the corresponding public key is used to verify at runtime those applications that were appropriately signed. The CDSA framework is coupled via a Service Provider Interface (SPI) to a plurality of pluggable modules for performing cryptographic operations, storing signed digital certificates for applications, and trust policies relating to cryptographic strengths. The framework is initialized to provide the cryptographic support for the application at which time it reads a vendor-signed cryptographic control policy file that determines the cryptographic key lengths at which various algorithms are considered cryptographically strong. All APIs for cryptographic operations require a crypto context so the application then requests the CDSA framework to create a crypto context given an algorithm ID, key and key length. By default, all crypto contexts are assigned the default or "weak" level of crypto. If the application has been authorized to use strong crypto by virtue of being signed, it next calls the API to request an exemption. The CDSA framework using a data structure determines if the application is signed or privileged to perform strong crypto according to the crypto context based on the previously read cryptographic control policy file. A flag is set in framework-controlled crypto context data structure if the application is entitled to strong crypto. Otherwise, the flag is not set and the application will be stopped from using strong crypto when the APIs is called to encrypt data.

BRIEF DESCRIPTION OF THE DRAWINGS

The invention will be further understood from a following detailed description of a preferred embodiment, taken in conjunction with an appended drawing, in which:

FIG. 6 is a flow diagram determining the crypto strength of an application in the system of FIG. 1.

DETAILED DESCRIPTION OF THE
PREFERRED EMBODIMENT

Figure 1:
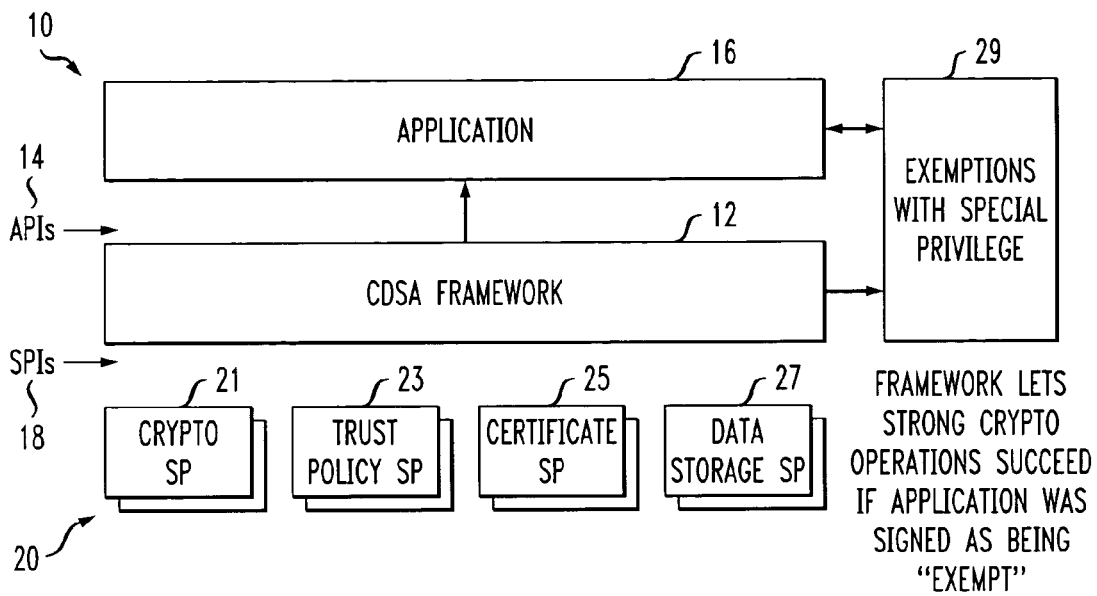
FIG. 1 is a representation of a cryptographic application interfacing through an API with a Common Data System Architecture-Improved system (CDSA-I) including a CDSA framework and incorporating the principles of the present invention.

In FIG. 1, a Common Data System Architecture—Improved system (CDSA-I) 10 is shown including a CDSA framework 12 coupled through a CDSA Application Program Interface (API) 14 to an Independent Software Vendor (ISV) application 16 into which cryptographic libraries are incorporated for security purposes. The CDSA framework is partially described in Appendix I and includes a Common Security Services Manager (CSSM) interfacing the application 16 through the API and through Service Provider Interfaces (SPIs) 18 to add-in or pluggable modules 20. Applications 16 request security services through the CSSM which maps API calls to the appropriate pluggable modules. The security services are performed by the pluggable modules which support encryption; digital certificate management; key recovery; trust policy and data storage in the application. These Add-in modules may also be provided by ISVs to augment the set of available security services or as competitive products.

A crypto module 21 performs cryptographic operations including encryption, decryption, digital signing, keypair generation, key exchange, and random number generation. A Trust Policy module 23 implements policies defined by authorities and institutions such as VeriSign and MasterCard. Each Trust Policy module embodies the semantics of a trust model based on using digital certificates as credentials. Applications may use a digital certificate as an identity credential and/or an authorization credential. A Certificate Library 25 provides format-specific, syntactic manipulations of memory-resident digital certificates and certificate revocation lists. A Data Storage module 27 provides persistent storage for certificates and certificate revocation lists. Certificate Libraries and Data Storage libraries make up the existence and manipulation of certificates and revocation lists orthogonal to the persistence of those objects. The Add-In modules must implement some or all of the CSSM defined security API 14.

The (CDSA-I) 10 supports various modes of security operation, providing different levels of functionality for the applications 16. To support these various modes, a privilege or exemption mechanism 29 is implemented within the architecture. The exemption or privilege mechanism 29 provides differing levels of security services to applications that possess different sets of privileges. The word "privilege" and "exemption" are used synonymously and interchangeably.

The basic aspects of the privilege mechanism for CDSA-I are:

Applications may be granted special privileges with respect to the CDSA-I architecture.

The CDSA framework within the architecture 10 provides a base level of services to non-privileged clients and an enhanced level of service to privileged clients.

Application layer modules using the CSSM API 14 may be granted special privileges based upon the exemption module 29. The privileges allow these application layer modules to obtain specialized services that are above and beyond the set of services provided by the CDSA framework to non-privileged applications and layer modules.

Privileges are associated with an application module via a set of signed manifest credentials. The signed manifest credentials are placed in a directory named Meta-INF at the same level as the privileged application module. Thus, if the path name for a privileged application is Alpha/Beta/Gamma/PrivAPP.exe, the credential file resides in the directory, Alpha/Beta/Gamma/Meta-INF/, and are named PrivAPP.sf, PrivAPP.mf, and PrivAPP.dsa.

The set of signed credentials for a privileged application includes a Manifest File (MF) in which there is a Privileged Vector attribute. The value of this attribute describes the privileges for the related application module. At the time an application module is shipped, a determination is made by a development house in liaison with relevant Government agencies, regarding the set of privileges that may be granted to the application. The application module is then signed with the appropriate set of privileges.

The CDSA architecture implements a number of built-in policy checks for controlled functions of the security services (i.e., compliant with the U.S. Export regulations). Applications may request exemptions from these built-in checks. The exemption is granted if the calling application provides credentials that:

Are successfully authenticated by the framework (i.e., the credentials matching the application module requesting privileges are signed by the CDSA framework vendor).

Carry attributes that allow the requested exemption (i.e., the total set of privileges assigned to the application includes the exemption being requested).

Exemptions are granted per application thread, if threads are supported in the operating system environment. The exemptions and privileges cannot be inherited by spawned processes or spawned or sibling threads. Each process or thread must present credentials and obtain its own exemption status.

The privilege or exemption mechanism allows the CDSA-I to support various modes of operation providing different levels of services to different application layer modules. The privilege mechanism in its full form is relevant only for the exportable versions of the CDSA framework within CDSA-I. When the CDSA framework contains U.S. domestic cryptographic control policy files, the framework provides a full set of services to all applications. It is not necessary to request or obtain privileges when working with U.S. domestic versions of the CDSA framework. However, in order to maintain compatibility between U.S. domestic and U.S. exportable versions of the CDSA-I architecture, the privileged APIs work as expected in both cases. The only difference being that with a U.S. domestic version of the CDSA framework, the actual credential files are not checked prior to granting of privileges to a requesting application. An application can request and be granted any set of privileges without the framework checking the application credentials.

The CSSM API includes data structures which enable a series of functions to be performed as follows:

1. CSSM_Exemption Mask:
   (a) This data structure defines a bit mask of exemptions or privileges pertaining to the CDSA framework. Exemptions are defined and correspond to built-in checks performed by the CDSA framework and the module manager. The caller must possess the necessary credentials to be granted the exemptions.
2. CSSM_RequestsExemption:
   (a) This function authenticates the application and verifies whether the application is authorized to receive a requested exemption. Authentication is based on the successful verification of the application signed manifest credentials. After the authentication step, the framework ensures that the credentials authorize the application to require the requested exemptions. The CDSA framework 12 has built-in knowledge of the allowable routes of trust for authenticating application credentials.

The credential verification step is bypassed when the CDSA framework is operating with a set of U.S. domestic cryptographic control policy files. The requested exemptions are granted automatically in this case, and an AppFileName and an AppPathName parameters may be left as null.

An exemption mask defines a requested exemption. The application file name and application path name specify the location of the application module, and allow the framework to locate the application's credentials.

Applications may invoke this function multiple times. Each successful verification replaces the previously granted exemptions. The exemptions are not inherited by spawned processes or spawned threads. If an ExemptionRequest parameters is 0, all privileges are dropped for that thread.

The AppFileName and the AppPathName parameters may be left as null if it is known for sure that the requested exemptions are a subset of the commonly possessed exemptions. In such cases, the actual credentials are not checked by the framework.

(b) Parameters:

(i) ExemptionRequests (Input):

A bit mask of all exemptions being requested by the caller. If the value is CSSM_Exempt_All, the caller is requesting all possible privileges that may be granted or accorded the credentials that are presented and checked.

(ii) AppFileName (Input):

The name of the file that implements the application (containing its main entry point). This file name is used to locate the application's credentials for purposes of verification and authentication by the framework. Note that the file name is expected not to have a leading or trailing path name to separate it ("/" or "\" depending on the platform of use).

(iii) AppPathName (Input):

The path to the file and to implement the application (containing its main entry point). This path name is used to locate the application's credentials for purposes of application authentication by the framework. Note that the path name may be a fully qualified path name or a relative path name from the current working directory. In either case, it is expected to contain a trailing path name separated ("\" or "\" depending on the platform of use).

(iv) Return Value:

A CSSM_OK return value signifies the verification operation was successful and the exemption has been granted. When CSSM_FAIL is returned, an error has occurred.

3. CSSM_EXEMPT_ALL:

(a) This is a bit mask that represents all the privileges defined by the CDSA framework. Using this bit mask on the CSSM_RequestExemption API, an application signed with all the privileges could be sure that it received all of the privileges possible in the CDSA framework. Other bitmasks include:

(i) CSSM_Exempt_Multi_Encrypt_Check (allows exemption from the check that stops a buffer from being encrypted multiple times);
(ii) CSSM_Strong_Crypto_With_KR (allows use of strong crypto by virtue of making a key recovery block available);
(iii) CSSM_Exempt_LE_KR (allows exemption from law enforcement restrictions on crypto);
(iv) CSSM_Exempt_ENT_KR (allows exemption from optional enterprise restrictions on crypto).

4. CSSM_CheckCSSMExemption:

(a) This function return exemptions possessed by the current thread. If the exemption returned is non-zero, it implies that the CSSM_RequestExemption API has been called to request a specific set of exemptions.

(b) Parameters:

(i) Exemptions (Output): A bit-mask of all exemptions possessed by the calling thread.

(ii) Return Value:

A CSSM_OK return value signifies the operation was successful and the exemption returned is valid. When CSSM_FAIL is returned, an error has occurred.

5. CSSM_Init: (a) This CDSA API must be called before any other API in order to activate the CDSA framework.

6. CSSM_EncryptData: (a) This CDSA API is the one that actually performs data encryption. It requires a crypto context (discussed previously), an input data buffer containing data to be encrypted and an output data buffer in which encrypted data will be written.

The operation of CDSA-I (10) will now be described in conjunction with FIGS. 2–6.

Figure 2:
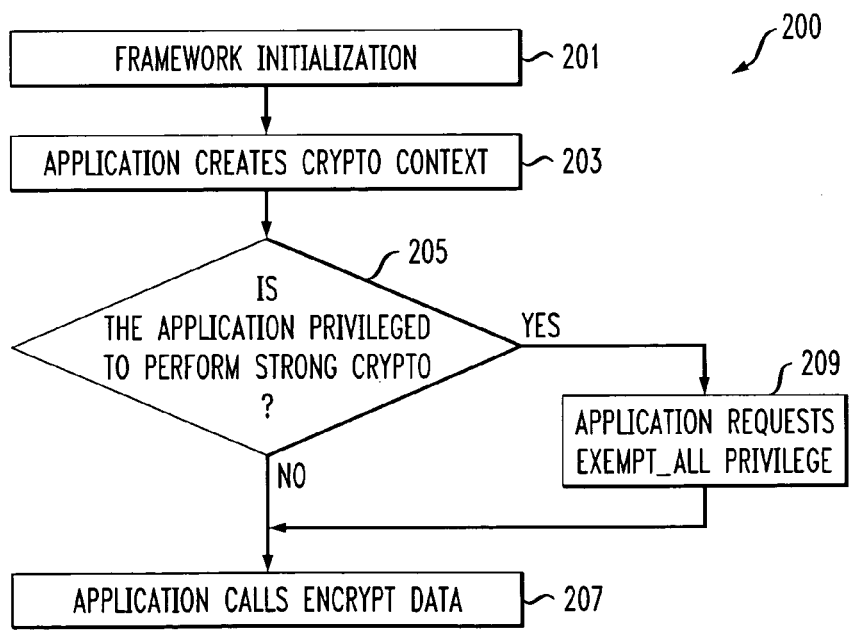
FIG. 2 is a flow diagram of an encryption sequence for strong and weak crypto applications in the system of FIG. 1.

In FIG. 2, an encryption sequence 200 is shown for strong and weak applications. In step 201, the CDSA framework is initialized. After initialization, the application creates a crypto. context in step 203. A test is performed in step 205 to determine if the application is privileged to perform strong crypto. A "no" condition initiates step 207 in which the application calls the encrypt data from the crypto module 21. A "yes" condition initiates step 209 in which the application requests the CSSM_EXEMPT_ALL privilege to allow the application to use strong crypto strengths in subsequent CSSM_EncryptData API calls.

Figure 3:
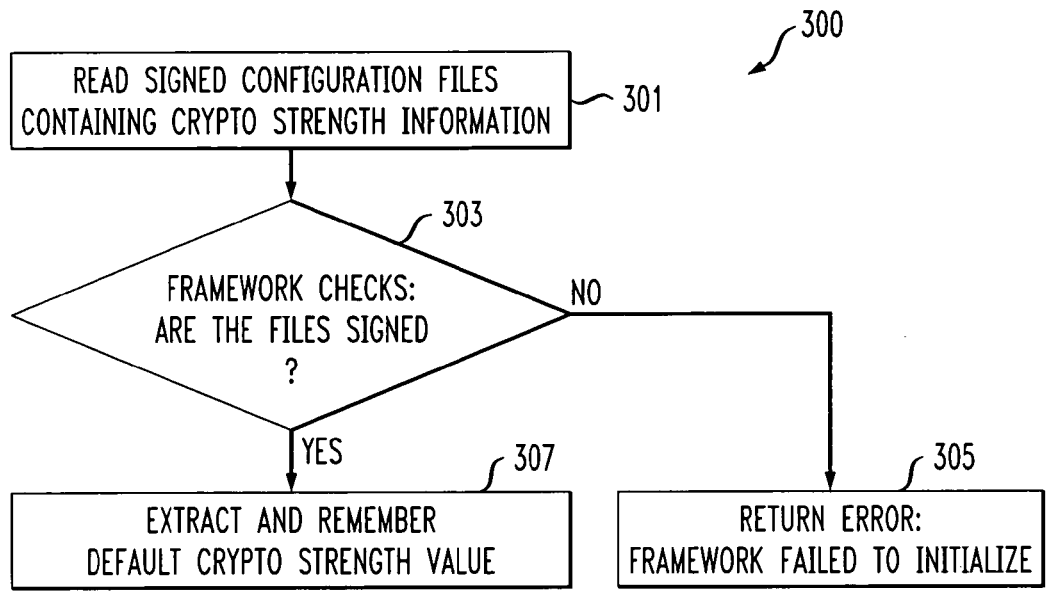
FIG. 3 is a flow diagram for the initialization of the CDSA framework in FIG. 1.

FIG. 3 describes an initialization sequence 300 for CDSA framework 12. In step 301 the CSSM reads the cryptographic policy configuration files containing the key lengths at which various algorithms are considered cryptographically strong. A test 303 is performed by the CDSA framework to determine whether the files are signed. A "no" condition initiates a step 305 to indicate an error code and that the framework failed to initialize; this condition forces an abort of the application since no CDSA API, cryptographically-related or not, can be called after such a failure. A "yes" condition initiates step 307 in which the framework extracts and remembers the default crypto strength values for the sequence 200.

Figure 4:
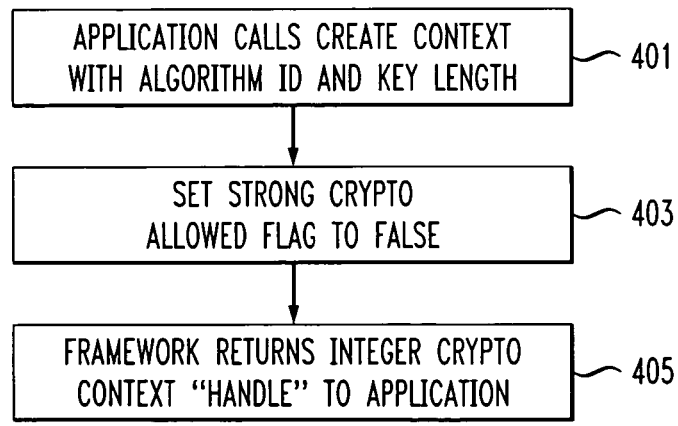
FIG. 4 is a flow diagram of an application creating a crypto context in the system of FIG. 1.

In FIG. 4 a create crypto context sequence 400 is initiated for the application 16. In step 401, the application calls the CSSM interface 14 to create a crypto context with an algorithm ID, key and key length provided by the CDSA framework. In step 403, the application sets the strong crypto allowed flag to FALSE; this way unprivileged applications will be restricted by default. In step 405, the framework returns an integer crypto context "handle" to the application. The "handle" includes an integer provided by the CDSA framework which is simply a way for the application to refer to the set of cryptographic parameters (often a large set) in subsequent API calls.

Figure 5:
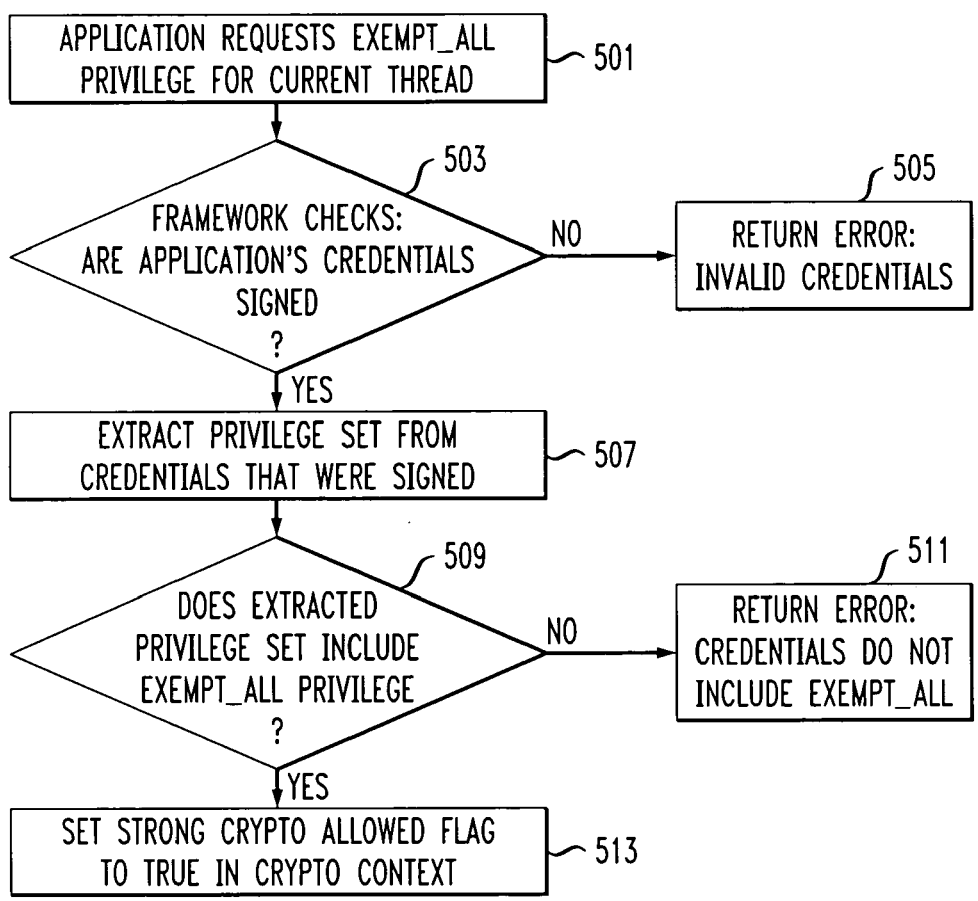
FIG. 5 is a flow diagram for requesting EXEMPT_ALL privilege in the system of FIG. 1.

Before describing FIG. 5 some background is necessary. In manufacture an application has either been signed by the CDSA framework vendor using a private key at the vendor's factory or it has not. The CDSA framework program code (a set of binary files distributed to customers) has embedded in it the public key matching the private key held at the factory. Hence, the CDSA framework can verify if an application file and its credential file have been signed at the factory with the vendor's private key by using the public key embedded in the CDSA framework program code.

Now turning to FIG. 5, a process 500 will now be described for initiating the CSSM_RequestExemption API with a parameter CSSM_EXEMPT_ALL signifying which privileges are being requested. In step 501, the application 16 requests the CSSM (another name for "framework") for the EXEMPT_ALL privilege for a current thread as a part of the encryption sequence 209 described in FIG. 2. A test 503 is performed by the CDSA framework to determine if the application credentials are signed. A "no" condition initiates step 505 in which the framework returns an error code for invalid credentials. A "yes" condition initiates step 507 to extract the privilege set from the credentials that were signed. A test 509 is performed to determine if the privilege set includes the privileges in the EXEMPT_ALL privilege set (e.g. represented as a bitmask). A "no" condition initiates step 511 in which the framework returns an error code that the credentials do not include the privileges in the EXEMPT_ALL privilege set. A "yes" condition initiates step 513 in which a strong crypto allowed flag is set to a "true" state in the crypto context.

FIG. 6 describes an encrypt data sequence 600 based upon the results of the process 500 in FIG. 5. In step 601, the application passes a crypto context "handle" as well as a data buffer to be encrypted. A test 603 is performed to determine if the requested crypto strength is greater than the default crypto strength. A "no" condition initiates step 605 to encrypt the data buffer with the default crypto strength. A "yes" condition initiates a test 607 to determine if the strong crypto allowed flag has been set to "true". A "no" condition returns an error code in step 609 that the application is not privileged to strong crypto. A "yes" condition encrypts the data buffer with a strong crypto strength using the crypto module 21 as authorized by the exemption mechanism 29 shown in FIG. 1 based upon the application credentials and digital signature provided by the manufacturer and contained in the application 16.

Summarizing, in the CDSA-I system 10 the CDSA framework 12 enforces the maximum cryptographic strength for each application 16 taking into account an exemption or privilege mechanism. If an application has no privilege, the CDSA framework will allow only the use of a default maximum cryptographic strength. However, if an application has a "strong crypto" privilege, the framework allows that application to access the strongest cryptographic strength available. Each application requiring privilege must be signed by a private key that is controlled by the CDSA framework vendor. Inside the CDSA framework, the corresponding public key is used to verify, at run times, that those applications were signed appropriately. The CDSA-I system 10 provides a dynamic, plug & play framework for varying maximum cryptographic strength for applications taking into account an exemption or privilege mechanism.

APPENDIX I
Common Data Security Architecture Specification
Release 1.0
October 1996
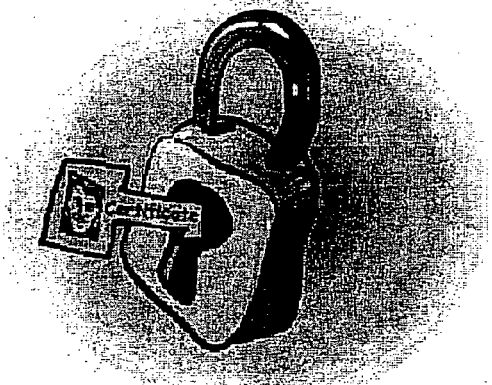
Subject to Change Without Notice

APPENDIX I

| Release 1.0 | CDSA Specification | Page 3 |
|---|---|---|

1.3 Status of This Specification

This document describes the CDSA specification. Intel has completed its first implementation of the CSSM, the core infrastructure in this architecture. We welcome constructive comments and feedback for this document. Please direct your suggestions via email to:
    CDSA@ibeam.intel.com

1.4 Other References

| | |
|---|---|
| BSAFE* | *BSAFE Cryptographic Toolkit*, RSA Data Security, Inc., Redwood City, CA |
| PKCS* | *The Public-Key Cryptography Standards*, RSA Laboratories, Redwood City, CA: RSA Data Security, Inc. |
| X.509 | *CCITT. Recommendation X.509: The Directory – Authentication Framework*. 1988. CCITT stands for Comite Consultatif Internationale Telegraphique et Telphonique (International Telegraph and Telephone Consultative Committee) |
| Cryptography | *Applied Cryptography, Second Edition Protocols, Algorithms, and Source Code in C*, Bruce Schneier: John Wiley & Sons, Inc., 1996 |

1.5 Common Data Security Architecture

The Common Data Security Architecture defines the infrastructure for a comprehensive set of security services. Cryptography is the computational base used to build security protocols and security systems. CDSA is an extensible architecture that provides mechanisms to dynamically manage add-in security modules. Figure 1 shows the three layers of the Common Data Security Architecture. The Common Security Services Manager (CSSM) is the core of CDSA. CSSM defines a common API that applications must use to access services of add-in security modules. Applications request security services through the CSSM security API or via layered security services and tools implemented over the CSSM API. The requested security services are performed by add-in security modules. Four types of modules are defined:

- Cryptographic Services
- Trust Policy Services
- Certificate Library Services
- Data Storage Library Services Add-in security modules may be provided by independent software and hardware vendors as competitive products. Applications may direct their requests to modules from specific vendors or to any module that performs the required services. Add-in modules augment the set of available security services.

APPENDIX I

| Page 4 | CDSA Specification | Release 1.0 |

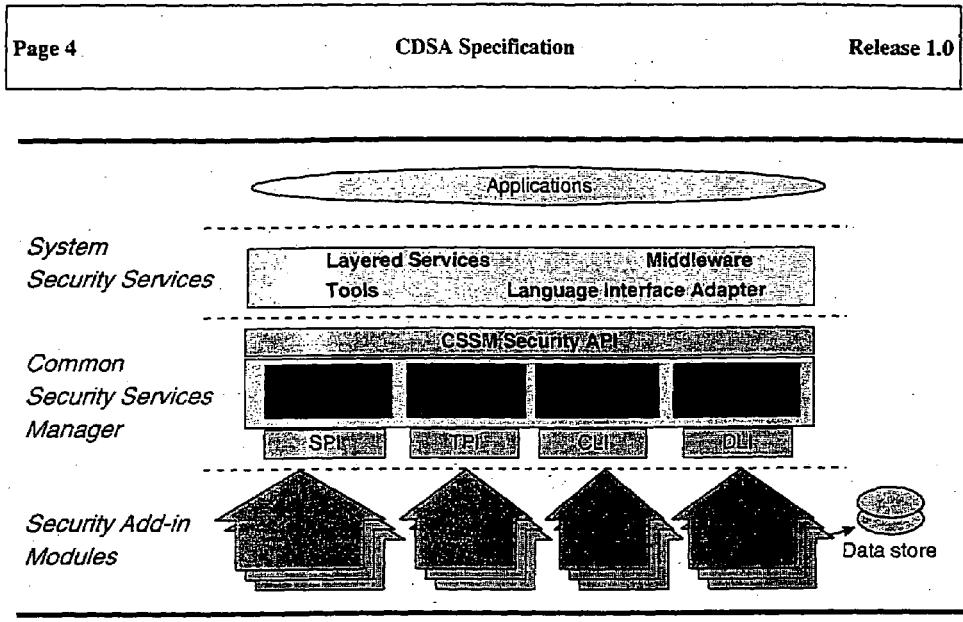

Figure 1. The Common Data Security Architecture for all platforms.

1.5.1 Architectural Assumptions

The CDSA design follows five architectural principles:

- A layered service provider model. CDSA is built up from a set of horizontal layers, each providing services to the layer above it. This approach is portable, adaptable, modular, and open.

- Open architecture. The CDSA is fully disclosed for peer review by the industry.

- Modularity and extensibility. Components of each layer can be chosen as separate modules. An extensible framework supports inserting domain-specific functions. Extensibility fosters industry growth by encouraging development of incremental functionality and performance competitive implementations of each add-in module.

- Value in managing the details. The CDSA can manage security details, so individual applications do not need to be concerned with security-related details.

- Emerging paradigms. The CDSA is built on emerging data-security paradigms.

Regarding the emerging data-security paradigms, the architecture is built on two fundamental premises:

Portable digital tokens are used as a person's digital persona for commerce, communications, and access control. These digital tokens are encryption modules, with some amount of encrypted storage. They can be software or hardware, depending on the application's security needs. They come in various form factors, and may have multiple functions aggregated into a single device, such as a digital wallet.

Digital certificates can be used to embody trust. These certificates do not create any new trust models or relationships. They are the digital form for current trust models. A person may have a certificate for each trust relationship (such as multiple credit cards, checkbooks, employer ID).

The ability of client platforms to accommodate these two new technologies is critical to the success of such platforms for digital commerce and information management as the Intranet extends seamlessly into the Internet.

APPENDIX I

| Release 1.0 | CDSA Specification | Page 7 |
|---|---|---|

1.7.2 Common Security Services Manager Layer

The second level of CDSA is the Common Security Services Manager (CSSM). CSSM, the essential component in the CDSA model integrates and manages all the security services. It enables tight integration of individual services, while allowing those services to be provided by interoperable modules. The CSSM has a rich API to support developing secure applications and system services and SPI supporting plug-in security modules that implement building blocks for secure operations.

CSSM does not prescribe or implement certificate-based security policy. Application-specific security policies are defined and implemented by add-in modules and layered services. The CSSM integrates and manages the fundamental components and defines a common API for accessing the services provided by add-in modules. Similarly, the CSSM contains no cryptography algorithms. CSSM maps API calls to appropriate plug-in modules through the SPI. It's commonly referred to as "crypto with a hole."

CSSM provides security context services to assist applications in managing the numerous parameters required for cryptographic operations during application execution sessions. CSSM also provides essential integrity services, such self-checking the digital signature of the CSSM executable to detect tampering.

By managing security, the CSSM removes this burden from users and applications. CSSM management services are partitioned among four managers:

- Cryptographic Services Manager
- Trust Policy Services Manager
- Certificate Services Manager
- Data Store Services Manager The Cryptographic Services Manager administers the Cryptographic Service Providers that may be installed on the local system. It defines a common API for accessing all of the Cryptographic Service Providers that may be installed beneath it. All cryptography functions are implemented by the CSPs. The manager administers a queryable registry of local CSPs. The registry lists the locally accessible CSPs and their cryptographic services (and algorithms).

The Trust Policy Services Manager administers the trust policy modules that may be installed on the local system. It defines a common API for these libraries. The API allows applications to request security services that require "policy review and approval" as the first step in performing the operation.

Operations defined in the API include verifying trust in

- A certificate for signing or revoking another certificate
- A user or user-agent to perform an application-specific action
- The issuer of a certificate revocation list All policy-specific tests and decisions are implemented by the add-in trust policy module. Application-invoked calls are dispatched to the appropriate module. The CSSM trust policy services manager administers a queryable registry of locally accessible modules.

The Certificate Services Manager administers the Certificate Libraries that may be installed on the local system. It defines a common API for these libraries. The API allows applications to manipulate memory-resident certificates and certificate revocation lists.

Operations defined in the API include create, sign, verify, and extract field values. All certificate operations are implemented by the add-in certificate libraries. Application-invoked calls are dispatched to the appropriate library module. Each library incorporates knowledge of certificate data formats and how to manipulate that format. The CSSM Certificate Services Manager administers a queryable registry of local

APPENDIX I

| Page 8 | CDSA Specification | Release 1.0 | libraries. The registry enumerates the locally accessible libraries and attributes of those libraries, such as the certificate type manipulated by each registered library.

The Data Store Services Manager defines an API for secure, persistent storage of certificates and certificate revocation lists (CRLs). The API allows applications to search and select certificates and CRLs, and to query meta-data about each data store (such as its name, date of last modification, size of the data store, etc.) Data store operations are implemented by add-in data storage library modules.

These modules may be drivers or gateways to traditional, full-featured Database Management Systems (DBMS), customized services layered over a file system, or access to other forms of stable storage. A data storage module may execute and store its data locally or remotely.

1.7.3 Security Add-in Modules Layer

CDSA envisions four types of Security add-in modules:

- Cryptographic Service Providers (CSPs)
- Trust Policy modules (TPs)
- Certificate Library modules (CLs)
- Data Storage Library Modules (DLs)

1.7.3.1 Cryptographic Service Providers (CSPs)

Cryptographic service providers (CSPs) are modules equipped to perform cryptographic operations and to securely store private keys. A CSP may implement one or more of these cryptographic functions:

- Bulk encryption algorithm
- Digital signature algorithm
- Cryptographic hash algorithm
- Unique identification number
- Random number generator
- Secure key storage
- Custom facilities unique to the CSP A CSP may be instantiated in software, hardware, or both. Installing a CSP with the CSSM Cryptographic Services Manager makes that CSP accessible for use on the local system. The installation process records, in a persistent registry, the CSP's identifying name, a list of cryptographic services provided by the CSP, and the information required to dynamically load the CSP. Applications may query the registry and select one or more CSPs based on their capabilities.

All CSPs must enable encrypted storage for private keys and variables. CSPs must also deliver key management services, including key escrow, if it's supported. As a minimum, CSPs do not reveal key material unless it's been wrapped, but they must support importing, exporting, and generating keys.

The key-generation module of a CSP should be made tamper resistant. The CSSM Integrity Services provides mechanisms that may be used by a CSP to make itself more tamper resistant.

1.7.3.2 Trust Policy modules (TPs)

Trust policy modules implement policies defined by authorities and institutions. Policies define the level of trust required before certain actions can be performed. Three basic action categories exist for all certificate-based trust domains:

SOM919990014US3

APPENDIX I

| Release 1.0 | CDSA Specification | Page 9 |
|---|---|---|

- Actions on certificates
- Actions on certificate revocation lists
- Domain-specific actions (such as issuing a check or writing to a file).

The CSSM Trust Policy API defines the generic operations that should be supported by every TP module. Each module may choose to implement the subset of these operations that are required for its policy.

The CSSM API defines a pass-through function. This mechanism allows each module to provide additional functions along with those defined by the CSSM Trust Policy API. When a TP function has determined the trustworthiness of performing an action, the TP function may invoke certificate library functions and data storage library functions to carry out the mechanics of the approved action.

TP modules must be installed and registered with the CSSM Trust Policy Services Manager. Applications may query the Services Manager to retrieve properties of the TP module, as defined during installation.

1.7.3.3 Certificate Library Modules (CLs)

Certificate library modules implement syntactic manipulation of memory-resident certificates and certificate revocation lists. The CSSM Certificate API defines the generic operations that should be supported by every CL module. Each module may choose to implement only those operations required to manipulate a specific certificate data format.

The implementation of these operations should be semantic free. Semantic interpretation of certificate values should be implemented in TP modules, layered services, and applications. A pass-through function is defined in the CL API. This mechanism allows each CL to provide additional functions to manipulate certificate and certificate revocation lists in memory.

The CSSM architecture makes manipulation of certificates and certificate revocation lists orthogonal to persistence of those objects. Hence, it is not recommended that CL modules invoke the services of data storage library modules. Decisions regarding persistence should be made by TP modules, layered security services, and applications.

CL modules must be installed and registered with the CSSM Certificate Services Manager. Applications may query the Services Manager to retrieve properties of the CL module as defined during installation.

1.7.3.4 Data Storage Library Modules (DLs)

A Data storage library module provides stable storage for certificates and certificate revocation lists (CRLs). Stable storage could be provided by a

- Commercially-available database management system product
- Native file system
- Custom hardware-based storage devices Each DL module may choose to implement only those operations required to provide persistent storage for certificates and CRLs under its selected model of service.

The implementation of DL operations should be semantic free. Semantic interpretation of certificate values and CRL values should be implementation in TP modules, layered services, and applications. A pass-through function is defined in the DL API. This mechanism allows each DL to provide additional functions to store and retrieve certificates and CRLs, such as performance enhancing retrieval functions.

While the invention has been shown and decribed in conjunction with a specific embodiment, various changes can be made without departing from the spirit and scope of the invention as defined in the appended claims, in which:

We claim:

1. A method of selecting a cryptographic strength for at least one application, in accordance with a framework for providing cryptographic support of the at least one application, comprising the steps of:
    performing data encryption at a first cryptographic strength when the at least one application is privileged to perform encryption at a first cryptographic strength; and
    performing data encryption at a second cryptographic strength when the at least one application is not privileged to perform encryption at the first cryptographic strength, wherein the first cryptographic strength is stronger than the second cryptographic strength.

2. The method of claim 1, further comprising the steps of:
    initializing the framework to provide cryptographic support for the at least one application; and
    creating a cryptographic context for the at least one application.

3. The method of claim 2, wherein the step of initializing the framework comprises the steps of:
    reading at least one configuration file comprising cryptographic strength information;
    determining if the at least one configuration file is signed;
    returning an error that the framework failed to initialize when the at least one configuration file is not signed; and
    extracting and remembering at least one second cryptographic strength value when the at least one configuration file is signed.

4. The method of claim 3, wherein the cryptographic strength information comprises key lengths at which at least one algorithm is considered at the first cryptographic strength.

5. The method of claim 2, wherein the step of creating a cryptographic context comprises the steps of:
    providing an algorithm identification, a key and a key length to the at least one application;
    setting the cryptographic context to the second cryptographic strength at the at least one application; and
    returning an integer to the at least one application referring to cryptographic parameters.

6. The method of claim 5, wherein the step of setting the cryptographic context to the second cryptographic strength comprises the step of setting a first cryptographic strength flag to false in the cryptographic context.

7. The method of claim 5, wherein the integer comprises a cryptographic context handle.

8. The method of claim 1, wherein the step of performing data encryption at a first cryptographic strength comprises the step of determining if the at least one application is privileged to perform encryption at a first cryptographic strength.

9. The method of claim 8, wherein the step of determining if the at least one application is privileged to perform encryption at the first cryptographic strength comprises the steps of:
    determining if application credentials are signed; and
    returning an error of invalid credentials when the credentials are not signed.

10. The method of claim 8, wherein the step of determining if application credentials are signed comprises the step of matching a public key embedded in the framework and a private key in the at least one application.

11. The method of claim 8, wherein the step of determining if the at least one application is privileged to perform encryption at the first cryptographic strength comprises the steps of:
    extracting a privilege set from credentials of the at least one application;
    determining if the extracted privilege set comprises privileges defined by the framework;
    returning an error when the extracted privilege set does not comprise privileges defined by the framework; and
    setting the cryptographic context to the first cryptographic strength when the extracted privilege set comprises privileges defined by the framework.

12. The method of claim 1, wherein the step of performing data encryption at the first cryptographic strength comprises the steps of:
    receiving an integer referring to cryptographic parameters and a data buffer to be encrypted from the at least one application;
    determining if the requested cryptographic strength is greater than a second cryptographic strength;
    encrypting the data buffer with the second cryptographic strength when the requested cryptographic strength is not greater than the second cryptographic strength;
    determining if the cryptographic context is set to the first cryptographic strength when the requested cryptographic strength is greater than the second cryptographic strength;
    encrypting the data buffer with the first cryptographic strength when the cryptographic context is set to the first cryptographic strength; and
    returning an error that the at least one application is not privileged for the first cryptographic strength when the cryptographic context is not set to the first cryptographic strength.

13. The method of claim 1, further comprising the step of providing an exemption mechanism for the at least one application.

14. The method of claim 1, wherein the at least one application is a common data security architecture at least one application.

15. The method of claim 1, wherein the framework is a common data security architecture framework.

16. A system for selecting a cryptographic strength for at least one application, the system comprising:
    an at least one application requiring cryptographic support; and
    an application framework, coupled to the at least one application by an application program interface, operative to: (i) perform data encryption at a first cryptographic strength when the at least one application is privileged to perform encryption at a first cryptographic strength; and (ii) perform data encryption at a second cryptographic strength when the at least one application is not privileged to perform encryption at the first cryptographic strength, wherein the first cryptographic strength is stronger than the second cryptographic strength.

17. The system of claim 16, wherein the application framework is further operative to:
    initialize the framework to provide cryptographic support for the at least one application; and create a cryptographic context for the at least one application.

18. The system of claim 16, wherein performing data encryption at a first cryptographic strength comprises determining if the at least one application is privileged to perform encryption at a first cryptographic strength.

19. The system of claim 16, wherein determining if the at least one application is privileged to perform encryption at the first cryptographic strength comprises:
   extracting a privilege set from credentials of the at least one application;
   determining if the extracted privilege set comprises privileges defined by the framework;
   returning an error when the extracted privilege set does not comprise privileges defined by the framework; and
   setting the cryptographic context to the first cryptographic strength when the extracted privilege set comprises privileges defined by the framework.

20. The system of claim 16, wherein performing data encryption at the first cryptographic strength comprises:
   receiving an integer referring to cryptographic parameters and a data buffer to be encrypted from the at least one application;
   determining if the requested cryptographic strength is greater than a second cryptographic strength;
   encrypting the data buffer with the second cryptographic strength when the requested cryptographic strength is not greater than the second cryptographic strength;
   determining if the cryptographic context is set to the first cryptographic strength when the requested cryptographic strength is greater than the second cryptographic strength;
   encrypting the data buffer with the first cryptographic strength when the cryptographic context is set to the first cryptographic strength; and
   returning an error that the at least one application is not privileged for the first cryptographic strength when the cryptographic context is not set to the first cryptographic strength.

* * * * *